(12) United States Patent
Tchepnda et al.

(10) Patent No.: US 8,379,611 B2
(45) Date of Patent: Feb. 19, 2013

(54) METHOD OF COMMUNICATION BETWEEN A SOURCE NODE AND A DESTINATION NODE BOTH BELONGING TO A VEHICULAR NETWORK

(75) Inventors: Christian Tchepnda, Issy les Moulineaux (FR); Hassnaa Moustafa, Boulogne Billancourt (FR)

(73) Assignee: France Telecom, Paris (FR)

( * ) Notice: Subject to any disclaimer, the term of this patent is extended or adjusted under 35 U.S.C. 154(b) by 443 days.

(21) Appl. No.: 12/665,873

(22) PCT Filed: Jun. 18, 2008

(86) PCT No.: PCT/FR2008/051082
§ 371 (c)(1),
(2), (4) Date: Feb. 23, 2010

(87) PCT Pub. No.: WO2009/007563
PCT Pub. Date: Jan. 15, 2009

(65) Prior Publication Data
US 2010/0165999 A1   Jul. 1, 2010

(30) Foreign Application Priority Data

Jun. 22, 2007   (FR) ..................................... 07 55945

(51) Int. Cl.
*H04Q 7/24*   (2006.01)
(52) U.S. Cl. ......................... 370/338; 370/310; 370/328
(58) Field of Classification Search .................. 370/338, 370/310, 328; 455/432.1
See application file for complete search history.

(56) References Cited

U.S. PATENT DOCUMENTS

| 6,611,688 | B1 | 8/2003 | Raith |
| 6,748,233 | B1* | 6/2004 | Arnold et al. ................. 455/522 |
| 6,750,813 | B2* | 6/2004 | Vargas-Hurlston et al. ......................... 342/357.4 |
| 7,023,818 | B1 | 4/2006 | Elliott |

(Continued)

FOREIGN PATENT DOCUMENTS

| EP | 0948222 A2 | 10/1999 |
| JP | 11306488 A | 11/1999 |

(Continued)

OTHER PUBLICATIONS

International Search Report and Written Opinion dated Nov. 21, 2008 for corresponding International Application No. PCT/FR2008/051082, filed Jun. 18, 2008.

(Continued)

*Primary Examiner* — Chuong T Ho
(74) *Attorney, Agent, or Firm* — David D. Brush; Westman, Champlin & Kelly, P.A.

(57) ABSTRACT

A method of communication between a source node in motion and a destination node. The method includes the following steps implemented by the destination node: receiving a packet sent by the source node, said packet including current mobility information relating to the source node; and, for routing at least one response packet intended for the source node: predicting a location geographical area of the source node from the current mobility information relating to the source node contained in said packet received therefrom beforehand, the geographical area thus predicted purportedly being a destination geographical area; at least one step of sending to the destination geographical zone another packet containing said response packet and the destination geographical zone and, if appropriate, passing in transit through at least one intermediate node of a vehicular network.

8 Claims, 3 Drawing Sheets

U.S. PATENT DOCUMENTS

| | | | |
|---|---|---|---|
| 7,075,886 B2* | 7/2006 | Futernik | 370/216 |
| 2003/0137930 A1* | 7/2003 | Futernik | 370/216 |
| 2004/0017310 A1* | 1/2004 | Vargas-Hurlston et al. | 342/357.1 |
| 2004/0236499 A1 | 11/2004 | Watanabe | |
| 2007/0066312 A1 | 3/2007 | Shomura et al. | |
| 2007/0086427 A1* | 4/2007 | Cohen et al. | 370/351 |
| 2007/0223410 A1* | 9/2007 | Oyama et al. | 370/310 |
| 2007/0253341 A1* | 11/2007 | Atkinson et al. | 370/252 |
| 2007/0263571 A1* | 11/2007 | Hermann et al. | 370/338 |

FOREIGN PATENT DOCUMENTS

| | | |
|---|---|---|
| JP | 2003087169 A | 3/2003 |
| JP | 2004096356 A | 3/2004 |
| JP | 2004310484 A | 11/2004 |
| JP | 2005252961 A | 9/2005 |

OTHER PUBLICATIONS

Jian Li et al: "PANDA: A Novel Mechanism for Flooding Based Route Discovery in ad hoc Networks" Wireless Networks; The Journal of Mobile Communication, Computation and Information, Kluwer Academic Publishers, DO, vol. 12, No. 6, Apr. 27, 2004.

English Translation of the International Preliminary Report on Patentability of Counterpart Application No. PCT/FR2008/051082 filed Jun. 18, 2008.

Japanese Office Action with English translation dated Feb. 24, 2012 for corresponding Japanese Application No. 2010-512748.

Young-Bae Ko, Nitin H. Vaidya, "Location-Aided Routing (LAR) in Mobile ad hoc Networks", Wireless Networks, Kluwer Academic Publishers, Jul. 31, 2000, vol. 6, Issue 4, pp. 307-321.

* cited by examiner

Fig 5

METHOD OF COMMUNICATION BETWEEN A SOURCE NODE AND A DESTINATION NODE BOTH BELONGING TO A VEHICULAR NETWORK

CROSS-REFERENCE TO RELATED APPLICATIONS

This Application is a Section 371 National Stage Application of International Application No. PCT/FR2008/051082, filed Jun. 18, 2008 and published as WO 2009/007563 on Jan. 15, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a technique for communication between a source node and a destination node, the nodes belonging to a vehicular network and being adapted to route packets in the network, and the source node being in motion.

The field of the disclosure is that of vehicular networks. These are a particular form of ad hoc hybrid mobile networks. In such networks, mobile nodes communicate via wireless links with one another and with fixed access points belonging to the infrastructure of a communications network. The fixed access points are deployed by an operator of the communications network, for example along roads.

BACKGROUND OF THE DISCLOSURE

The Extensible Authentication Protocol (EAP) covered by RFC 2284 is used to authenticate a client in order to enable the client to access the infrastructure of the operator and the services that the operator offers. This method of authenticating and managing access to services gives satisfactory results when the mobile node and an access point to the infrastructure of the operator are in direct communication, i.e. when the mobile node and the access point are within transmission range of each other.

A first implementation of EAP authentication is implemented on top of layer 2 of the OSI network reference model specified in IEEE standards 802.11i and 802.16. Access to the infrastructure of the operator for a given client is unlocked following successful authentication of the client. However, because EAP data is encapsulated in the data link layer, it is not possible at present for a mobile node to be authenticated when it is not within direct range of an access point.

A second implementation of EAP authentication is implemented on top of layer 3 of the OSI network reference model. It is known as the Protocol for carrying out Authentication for Network Access (PANA), and is being standardized by the IETF. The aim of this protocol is to enable authentication of clients for access to an infrastructure using the Internet Protocol (IP). Its implementation on top of the IP layer enables it to benefit from the routing protocol and consequently makes EAP authentication possible when the mobile node is not within direct range of an access point. In this situation, one or more other mobile nodes serve as relays to an access point. One of the other mobile nodes within transmission range of the requesting mobile node serves as an entry point to the network. To implement the authentication procedure, a particular role is assigned to the other mobile node, referred to below as the access controller. However, this implementation causes various problems in the context of vehicular networks. The access controller has access to the security parameters of the client. In a vehicular network, it is not necessarily a so-called trusted node. Moreover, the PANA protocol requires exchanges associated with implementing authentication and subsequent exchanges with the infrastructure to be effected via the access controller. If the nodes are highly mobile, an authenticated mobile node remains within transmission range of the access controller only for limited periods. Moreover, to route packets, an IP routing infrastructure is required in the vehicular network for managing routing tables and the topology of the network.

There is therefore a requirement for a technique that enables a moving node to be authenticated by a communications network access point independently of setting up routing and topology tables, with exchanges between the moving node and the access point possibly being effected via other nodes, that are also mobile.

SUMMARY

The present disclosure responds to this requirement by proposing a method of communication between a source node in motion and a destination node, said nodes belonging to a vehicular network and being adapted to route packets in the network. The method includes the following steps executed by the destination node:
  a step of receiving a packet sent by the source node further including current mobility information relating to the source node;
and for routing at least one response packet to the source node:
  a step of predicting a location geographical area of the source node from current mobility information relating to the source node contained in said packet received beforehand therefrom, the geographical area predicted in this way purportedly being a destination geographical area; and
  at least one step of sending to the destination geographical area another packet including said response packet and the destination geographical area and, where appropriate, passing in transit through at least one intermediate node of the vehicular network.

Note that an exemplary embodiment the invention stems from the problem of a fixed communications network access point authenticating a moving node. An embodiment of the invention can nevertheless also be applied to dialogue between a moving source node and any destination node. The destination node may be fixed or moving. A packet sent by the source node and containing current mobility information in respect of the source node is routed in the vehicular network using information relating to the geographical position of the destination node of the packet i.e. the geographical destination area. This packet can be routed to the destination node in various ways. On receiving this packet, the destination node associates the received mobility information with the source node. For example, the mobility information includes the geographical position of the source node and its speed at the time the packet was sent. When the destination node must subsequently send a response packet to the source node, the destination node can predict a geographical area in which the source node is probably located on the basis of the mobility information, the time elapsed since the packet was received, and the current time. The packet is then routed to the geographical area predicted to be the destination geographical area. The process therefore avoids constructing and updating complex routing or location tables. It is particularly well suited to dialogues such as protocol exchanges between two nodes, for example those necessary to authenticate a node. Because it is implemented directly on top of layer 2 of the OSI reference model, a node cannot access IP layers before it is authenticated. This implementation is equally possible for multihop connections, i.e. when packets are routed between two nodes via other nodes that relay the packet. Routes are not created between the source node and the destination node. Moreover, in a vehicular network, the nodes being in motion, routes must be modified frequently and this requires exchanging large amounts of data between the various nodes of the network. This avoids frequent route updates. Furthermore, routing in accordance with an embodiment of the invention being opportunistic, a malicious node has little impact on packet routing.

The method is also particularly well suited to other protocol exchanges, such as those required for implementing the PANA protocol. Moreover, it can also be implemented when sending data on a one-off basis, such as data relating to road traffic accidents, cooperative driving, etc.

Furthermore, the packet sent by the source node and the other packet passing in transit via the intermediate node, the following steps are executed by the intermediate node:
- a test step during which the intermediate node verifies whether its current position is closer to the destination geographical area than that of the preceding intermediate node, which inserted its current position into said packet before forwarding it; and
- a step of forwarding the packet in transit to the destination geographical area only if the test is positive.

Each source or intermediate node sending a packet inserts its own current position. To optimize the conditions under which it relays or forwards a packet to be routed in the network, before forwarding it an intermediate node receiving the packet verifies whether it is closer to the destination geographical area than the preceding node. If not, there is no point in it forwarding the packet. Thus only some of the intermediate nodes receiving a packet forward it and congestion of the network by unnecessary transmission of packets is avoided. The packet can equally well be either a packet sent by the source node or a response packet sent by the destination node.

Moreover, the packet sent by the source node, respectively the other packet, is received in parallel by a plurality of intermediate nodes and each intermediate node executes the test step and where appropriate forwards the packet, respectively the other packet, in order to route the packet, respectively the other packet, via a plurality of concurrent paths.

A packet sent by the source node or the destination node is possibly routed via a plurality of concurrent paths as a function of the configuration of the vehicular network and the probability of the packet reaching its destination is higher.

Moreover, before the step of forwarding the packet in transit toward the destination geographical area, said intermediate node further verifies whether the angle between a reference direction and a line between the intermediate node and the destination geographical area is below a predetermined threshold.

The angle between a reference direction and a line between the intermediate node and the destination geographical area is determined. Only intermediate nodes for which this angle is below a predetermined threshold forward the packet. This limits the number of intermediate nodes forwarding a packet in order to optimize the routing of the packet in the network. This avoids unnecessary transmission of packets and reduces network congestion.

In one particular embodiment, the destination node being an access point to a communications network connected to an entity adapted to authenticate a client:
- before authentication, a packet sent by the source node to the access point is forwarded to the entity by the access point; and
- after authentication, the access point authorizes the moving node to access the communications network.

The context here is authorizing access to a communications network following successful authentication. In this situation, the source node is authorized to access the resources of the communications network via the access point following successful authentication by an authentication server. Access control is implemented at an access point of the communications network, which is therefore trusted. The security information in respect of the moving node is thus supplied only to network access points. Network mechanisms can equally be implemented in the network to enable the moving node to change access point.

An embodiment of the invention also provides a node of a vehicular network, adapted to communicate with other nodes of the network and including:
- means for receiving a packet sent by another moving node, said packet containing current mobility information relating to the other node;
- prediction means adapted to predict from the current mobility information relating to said other node contained in a packet previously received a location geographical area of the other moving node to which a response packet is to be routed, the geographical area predicted in this way purportedly being a destination geographical area;
- means for sending to the destination geographical area another packet containing the response packet and the destination geographical area.

An embodiment of the invention relates to a node further including test means for verifying, for a packet received and to be routed toward a destination geographical area, that the current geographical position of the node is closer to the destination geographical area than that of the preceding intermediate node.

An embodiment of the invention also provides a vehicular network in which packets are routed by nodes as a function of a destination geographical area, including:
- at least one node as described above;
- at least one mobile source node including means for sending packets to a destination node, adapted to add to a packet to be sent current mobility information; and
- at least one intermediate node including test means adapted, for a packet received and to be routed to a destination geographical area and if the source node and the destination node are not in direct radio range, to verify whether the current geographical position of the node is closer to the destination geographical area than that of the preceding intermediate node.

An embodiment of the invention also provides a program for a node of a vehicular network to communicate with another node of the network, said other node being in motion, said program including program instructions for, when said program is executed by the node:
- receiving a packet sent by another node, referred to as the source node, said packet containing current mobility information relating to the source node;

and, for routing a response packet to the source node:
predicting a location geographical area of the source node from the current mobility information relating to the source node contained in said packet received therefrom beforehand, the geographical area predicted in this way purportedly being a destination geographical area;
sending to the destination geographical area another packet containing said response packet and the destination geographical area.

An embodiment of the invention also provides a storage medium readable by a node in which the program described above is stored.

An embodiment of the invention further provides a signal supporting a message including a packet and a destination geographical area sent by a node of a vehicular network to another node, said geographical area being predicted from mobility information received from the other node that was current at an earlier time.

BRIEF DESCRIPTION OF THE DRAWINGS

The present disclosure can be better understood in the light of the following description of one particular embodiment of the invention given with reference to the appended drawings, in which.

DETAILED DESCRIPTION OF ILLUSTRATIVE EMBODIMENTS

Figure 1:
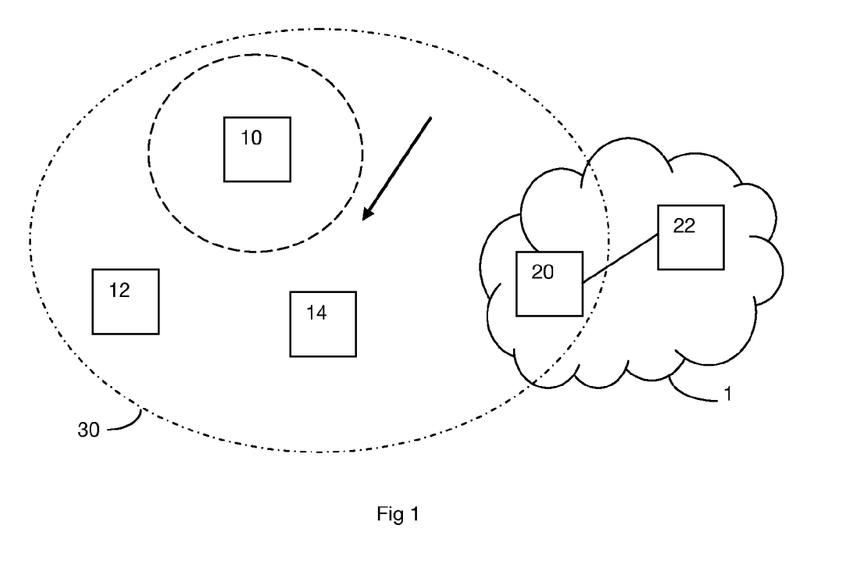
FIG. 1 represents a network architecture in which one particular embodiment of the invention is implemented.

There is represented in FIG. 1 a plurality of nodes 10, 12, and 14 belonging to a vehicular network 30. The node 10 is in motion and its direction of motion is represented in FIG. 1 by an arrow. A fixed access point 20 also belonging to the vehicular network 30 enables the nodes 10, 12, and 14 of the vehicular network to access a communications network 1. The nodes 10, 12, and 14 and the access point 20 are able to communicate with each other over a common radio channel via a radio interface, for example one implementing the IEEE 802.11 standard. They are adapted to route packets in the vehicular network 30 as a function of a destination geographical area. The mobile nodes are furthermore equipped with positioning and clock systems. The clocks of the nodes are synchronized with each other, for example by systems such as GPS, Galileo, etc.

To verify that users are entitled to access the communications network 1, the access point 20 is connected to an authentication server 22. The authentication server 22 is adapted to implement a procedure for authenticating a node 10 seeking access to the communications network 1. For example, the authentication procedure is effected using Extensible Authentication Protocol (EAP) messages. The access point 20 contributes to the implementation of the authentication procedure through dialogue with the moving node 10 and the authentication server 22.

Only one access point 20 to the communications network 1 is represented in FIG. 1. It must of course be understood that a plurality of such access points to the network is deployed over an area in which it is required to offer access to the communications network 1.

For example, the situation that applies below is one where the node 10 is seeking to access the communications network 1. It has selected an access point 20 to the communications network 1. How a node obtains the list of the access points to the communications network 1 and the geographical position of each access point is not described here.

Figure 2:
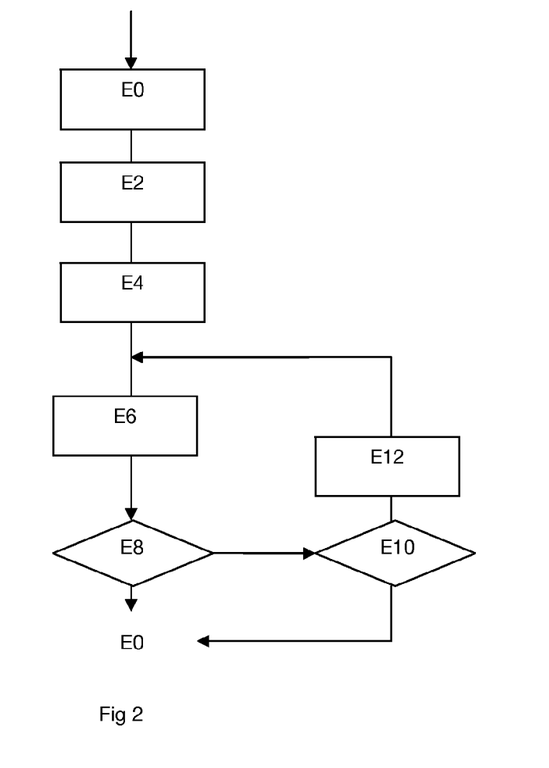
FIG. 2 represents the steps of the method implemented by a moving source node in one particular embodiment of the invention.

The method as implemented by a node 10 initiating dialogue with an access point 20 is described below with reference to FIG. 2.

Below the particular situation that applies is one in which the node 10 contacts the access point 20 with a view to its authentication by the authentication server 22.

The method is implemented directly on top of the OSI level 2 layer and does not enable a node to access IP layers before it is authenticated.

The method begins with an initial step E0 of waiting for a request to send a packet.

In a step E2, it detects that the node 10 has a packet to send to the access point 20, for example an EAP-Start message indicating that the node 10 is seeking to be authenticated by the authentication server 22 via the access point 20. In the node 10 itself, this packet is forwarded from a higher layer to a layer C that is itself immediately above layer 2 of the OSI network reference model.

In a step E4, the node 10 adds to the packet to be sent a header 50 for routing it to its destination, the access point 20.

Figure 4:
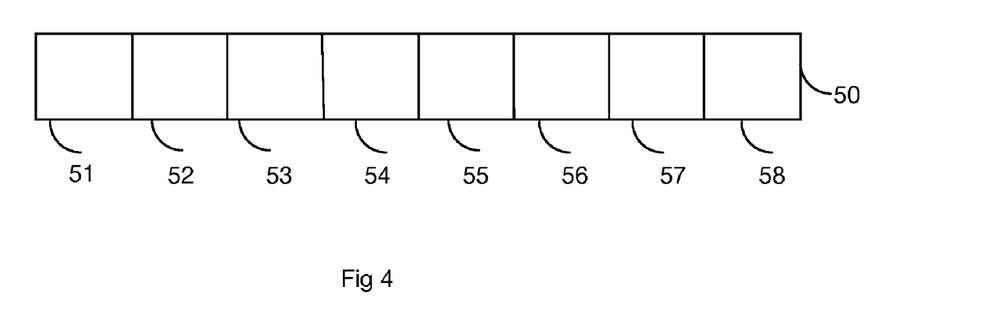
FIG. 4 represents a header of a message exchanged between two nodes in one particular embodiment of the invention.

As shown in FIG. 4, the header 50 contains the following information:
a field 51 identifying the source node of the packet;
a field 52 identifying the destination node of the packet;
a field 53 containing the geographical position of the source node of the packet;
a field 54 containing the speed of the source node of the packet;
a field 55 containing a time label;
a field 56 containing a lifetime of the packet, on expiry of which the packet must no longer be forwarded;
a field 57 containing information relating to the geographical area to which the packet must be routed;
a field 58 identifying the geographical position of the last sender of the message.

The use of these steps is described in detail below in the course of describing the steps of the method.

The fields 53 and 54 respective containing a geographical position and the speed of the source node of the packet correspond to current mobility information relating to the source node of the packet.

The time label field 55 contains the value of the clock of the source node at the time of sending.

The lifetime field 56 contains a predetermined value set by a parameter.

The destination geographical area field 57 contains the geographical position of the access point 20.

The field 58 is not present in this initial header.

In a step E6, the layer C sends the message containing the packet and its header 50 with a view to its transmission by the layers 2 and 1 and waits to receive a response or for a waiting time out T to expire. The message is sent over the radio channel and received by one or more nodes of the vehicular network located within transmission range of the node 10. Thus the moving node 10 sends a message containing the packet and current mobility information.

In particular, the mobility information belongs to the group comprising at least one geographical position and a speed.

A value Nb-retrans is initialized to zero.

A step E8 verifies whether a response message has been received from the access point 20. If so, the node 10 removes the header 50 from the response message received and obtains a response packet. The higher layer that requested sending of the packet by the source node 10 processes the response packet.

If no response has been received when the time out T expires, a step E10 tests if the maximum number of forwardings has been reached.

If so, the node 10 attempts to select a new access point with a view to reiterating its authentication request using conventional methods of selecting access points by a node.

If not, in a step E12 the node 10 increments the value of Nb-retrans and updates the values of the header 50, in particular the fields 53 and 54 containing the current mobility information, the time label field 55, and the lifetime field 56. There then follows the packet broadcasting step E6.

From now on the situation is that the message containing a header 50 and the packet to be routed has been sent over the radio channel.

Figure 3:
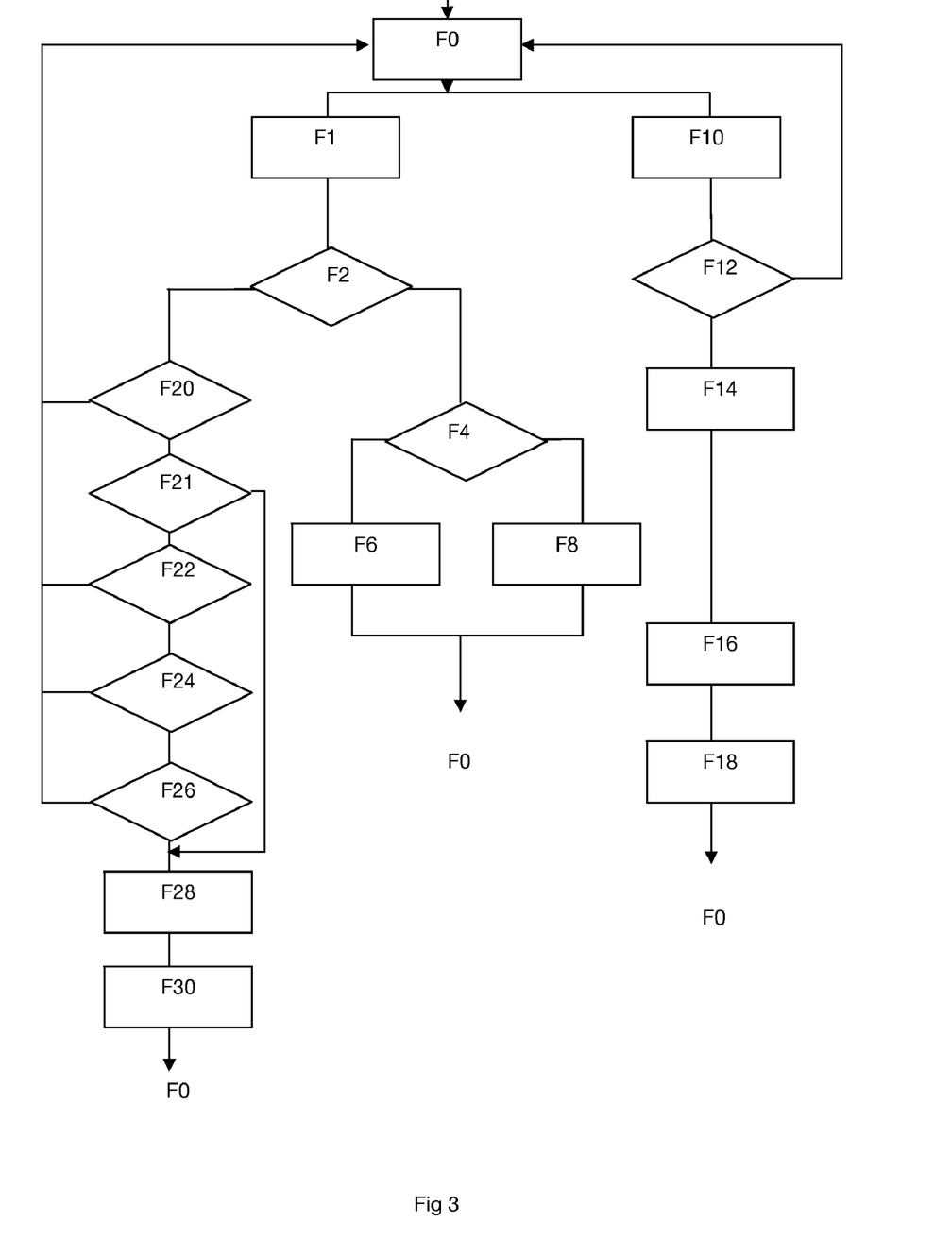
FIG. 3 represents the steps of the method implemented by a node of a vehicular network in one particular embodiment of the invention.

The method as implemented by an intermediate or relay node 12 receiving a message containing a header 50 and a packet to be routed over the radio channel is described below with reference to FIG. 3.

In a step F0 the intermediate node 12 waits to receive a message.

The method begins in a step F1 with the reception of a message containing a header 50 and a packet to be routed. In a step F2, the intermediate node 12 verifies whether it is the destination of the message by reading the field 52 identifying the destination node of the packet. In this particular situation the intermediate node 12 is not the destination of the packet, which is intended for the access point 20.

In a step F20, the intermediate node 12 verifies whether the message needs processing, i.e. if the lifetime indicated in the field 56 has expired.

If the lifetime of the message has expired, no processing is effected and there is a loop to the step F0 of waiting to receive a packet.

If the lifetime of the message has not expired, there follows a test step F21 described below. The situation discussed here is that the result of this test step F21 is negative. The node 12 determines in a step F22 an angle between a reference direction, for example the direction of the north pole, and the line between itself and the destination geographical area contained in the field 57. It calculates an angle to the reference direction on the basis of the geographical position of the intermediate node 12 and that of the destination geographical area in a spherical representation, for example as explained in the Appendix. Positions are expressed in terms of longitude and latitude. In the situation of processing the packet sent by the source node, the destination geographical area corresponds to the position of the access point 20. In the particular situation where the destination geographical area corresponds to a geographical position, the line between the intermediate node 12 and the destination geographical area corresponds to that between the intermediate node 12 and the geographical position of the access point 20. Whether this angle is below a predetermined threshold, for example π/2 rad, is then verified. If so, there follows a step F24. If not, no processing is effected and there is a loop to the step F0 of waiting to receive a message. Thus only nodes for which the angle between the reference direction and a line between the intermediate node 12 and the destination geographical area is below a predetermined threshold forward the packet, which avoids congestion of the network through unnecessary transmission of packets. Other methods can equally be used to determine the angle between the reference direction and a line between the intermediate node 12 and the destination geographical area.

In the step F24, the node 12 obtains from the header 50 the geographical position of the preceding sender of the message. If the source node is the preceding sender, it obtains the information by reading the field 53 identifying the source node. If not, i.e. if another intermediate node has forwarded the message, it obtains this information by reading the field 58 identifying the last sender of the message. It then verifies whether it is closer to the destination than the preceding sender of the message. If this is not true, no processing is effected and there is a loop to the step F0 of waiting to receive a message.

If this is true, i.e. if the node 12 is closer to the destination than the preceding sender node, the node 12 verifies in a step F26 that its radio coverage area is not the same as that of the preceding sender. If this is true, no processing is effected and there is a loop to the step F0 of waiting to receive a message. This avoids nodes that are very close together, i.e. that cover substantially the same transmission area, unnecessarily transmitting the message.

If this is not true, i.e. if the radio coverage area of the node 12 is not substantially the same as that of the preceding sender, in a step F28 the node 12 updates the values in the header 50, in particular the field 58 containing the geographical position of the last sender of the message, and sends the message containing the updated header 50 over the radio channel in a step F30. There is then a loop to the step F0 of waiting to receive a message.

Note that the packet can be received in parallel by a plurality of intermediate nodes and that each intermediate node then executes the steps of the method, and in particular the test steps, and where appropriate forwards the packet, so that the packet is routed via a plurality of concurrent paths.

The method as implemented by a node receiving over the radio channel a message of which it is the destination and containing a header 50 and a packet is described below, again with reference to FIG. 3. The particular situation here is that of the access point 20 receiving the message following its routing in the vehicular network 30. That the access point 20 receiving the message is its destination was verified in the step F2.

In a step F4, the access point 20 verifies whether the message must be processed or not, in particular by verifying whether the message has not already reached it or if the lifetime of the message has not expired. If it must process the message, it verifies whether there exists a dialogue context for the source node 10 whose identifier is indicated in the header 50 of the received message.

Note here that the expression dialogue context refers to information relating to the mobility of a node. A dialogue context is associated with a node, an access point, and a particular dialogue between the node and the access point. It contains mobility information sent by the node to the access point during the dialogue and a time label relating to that mobility information. For example, it can refer to a dialogue initiated by the node with a view to authentication by the authentication server and for which the access point serves as a relay.

This dialogue context enables the access point 20 thereafter to contact the source node that sent the message initiating the dialogue.

If the dialogue context already exists for the node identified in the header 50 in a step F6 the access point 20 updates the mobility information as a function of the information received in the message.

If there is no dialogue context for the node identified in the header 50, the access point 20 creates a dialogue context for the node 10 in a step F8 and stores the received mobility information.

The header 50 of the received message is then removed and the packet processed in the access point 20, in particular by a higher layer.

There is then a loop to the step F0 of waiting to receive a message over the radio channel or waiting to receive a request to send a message to a node.

The situation is now that in a step F10 the access point 20 receives a request from the higher layer to send a packet to the node 10.

The access point 20 verifies in a step F12 whether there is a dialogue context relating to the node 10. If not, the packet is not sent and the higher layer is notified of this internally. There is then a loop to the step F0.

If there is a dialogue context relating to the node 10 to which the response packet must be sent, the access point 20 obtains in a step F14 the stored mobility information, in particular the geographical position and the speed of the node 10, that was current when the message that led to creating or updating the dialogue context was sent.

In a prediction step F16, the access point 20 determines from the mobility information a geographical area in which the node 10 is probably located. That area is shown in FIG. 1 by a dashed-line circle around the node 10. For example, the maximum distance traveled by the node 10 since sending the message for which the current mobility information has been stored is determined. This message has taken a maximum time t1 equal to the lifetime of the message to reach the access point. The response message can equally take a maximum time t2 equal to the lifetime of the message to reach the node 10. A time t3 corresponds to the time elapsed between reception of the message coming from the node 10 and reception by the access point 20 of the message sent to the node 10. Using the current speed of the node and the cumulative time determined as described above, it is possible to deduce the maximum distance traveled by the node. Thus a geographical area in which it is probable that the node 10 is located is deduced from its last known geographical position. This area is represented as a circle whose center is the last known position of the node 10 and whose radius is the distance determined as described above, for example. The predicted geographical area is then deemed to be the destination geographical area. Thus a header 50 containing in the field 57 the destination geographical area is determined and in a step F18 the message containing the response packet and the header 50 is sent over the radio channel. The mobility information sent in the message by the moving node 10 initiating the dialogue therefore includes information required for predicting a location geographical area of the moving node at a later time. There is then a loop to the step F0.

The packet is then relayed to the destination geographical area via one or more intermediate nodes. An intermediate node receiving the packet in a step F1 implements the method as described above. It executes the steps F2 and F20. Then, in a step F21, the intermediate node verifies whether the destination geographical area field 57 contains a radius of mobility and if it is located within that radius of mobility. If this is true, there follows a step F28 in which the values in the header 50 are updated, in particular the geographical position field 58 of the last sender of the message, and a step F30 in which the message containing the updated header 50 is sent over the radio channel. There is then a loop to the step F0 of waiting to receive a message. If this is not true, i.e. if the destination geographical area does not contain a radius of mobility or if the destination geographical area contains a radius of mobility but the intermediate node 12 is not located within that radius of mobility, the steps F22 to F30 are executed, in particular the test steps F22 and F24, using for the position of the destination node the position information contained in the destination geographical area field 57, i.e. the last known position of the destination node. The line between the intermediate node 12 and the destination geographical area then corresponds to that between the intermediate node 12 and the last known position of the node for which the packet is intended.

Note that the method is implemented iteratively to exchange the various messages in the context of the authentication procedure.

Once the access point 20 has received an EAP-Success packet to be sent from the authentication server 22 to the node 10, it forwards it to the node 10 and authorizes it to access the communications network 1.

The method is described above for a moving node that is not in the coverage area of an access point. Note that it is equally applicable if the node initiates the authentication procedure when it is in the coverage area of the access point and leaves that area before the end of the procedure. The source node having sent its current mobility information before leaving the coverage area can be sent a response packet even when outside the coverage area of the access point. Thus in this situation the authentication procedure is not interrupted.

The above description of an authentication procedure relates to a particular situation. Note, however, that an embodiment of the invention is equally applicable to other exchanges of messages, such as those required to implement the PANA protocol or to send data on a one-off basis, such as data relating to road traffic accidents, cooperative driving, short messages, etc.

Note also that for reasons of clarity the method has been described as implemented successively at the source node, the intermediate node and then the destination node. It must of course be understood that the nodes of the vehicular network can interchangeably perform the roles of source node, intermediate node and destination node.

In a variant embodiment, the step F22 is not executed. This step F22 does improve the performance of the method but, even without the step F22, the method nevertheless offers acceptable performance.

Figure 5:
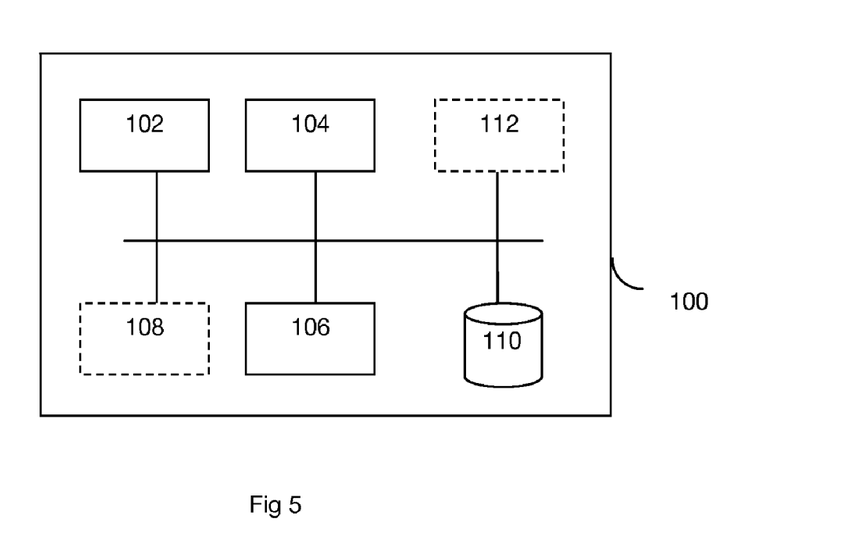
FIG. 5 represents a node of a vehicular network in one particular embodiment of the invention.

A node 100 of a vehicular network 30 able to communicate with other nodes of the network is described below with reference to FIG. 5. The node 100 includes communication means not shown in FIG. 5 enabling it to communicate via a radio interface with other nodes of the vehicular network 30. These communication means can implement the IEEE 802.11 standard.

Such a destination node 100 includes:
- a module 102 for receiving a packet sent by another node in motion, said packet containing current mobility information relating to that other node;
- a prediction module 104 for predicting a location geographical area of the other moving node from current mobility information relating to that other node contained in a packet received beforehand, to which area a response packet is to be routed, the geographical area predicted in this way reputedly being the destination geographical area;

a module 106 for sending to the destination geographical area another packet containing the response packet and the destination geographical area.

The current mobility information relating to a node is stored in storage means 110.

An intermediate node optionally further includes a test module 108 for verifying whether its current geographical position is closer than that of the preceding intermediate node to the target geographical area for a packet received and to be routed to a destination geographical area.

In one particular implementation, the module 108 also inserts the current geographical position of the node into the packet before sending it and verifies whether the angle between a reference direction and a line between the intermediate node and the destination geographical area is below a predetermined threshold.

Moreover, the intermediate node includes a module 112 for sending packets to a destination node that adds current mobility information to a packet to be sent.

Other types of radio interface can equally be supported, in particular radio interfaces implementing dedicated radio channels.

The modules 102, 104, 106, 108, and 112 implement the method described above. They are preferably software modules containing software instructions for executing the steps of the method described above, which instructions are executed by nodes performing the destination node role (where the modules 102, 104, 106 are concerned) and nodes performing the intermediate node or source node role (where the modules 108 and 112 are concerned). An embodiment of the invention therefore relates also to a program to be executed at a node of a vehicular network to communicate with another node of the vehicular network, said other node being in motion, this program including program instructions for, when said program is executed by the node:

receiving a packet sent by the source node including current mobility information relating to the source node;
and, for routing a response packet to the source node:
predicting a location geographical area of the source node from current mobility information relating to the source node contained in said packet received beforehand therefrom;
sending to the destination geographical area another packet including said response packet and the destination geographical area.

An embodiment of the invention also relates to a storage medium readable by a node and in which the program is stored.

The software modules can be stored in or transmitted by a data medium. This can be a hardware storage medium, for example a CD-ROM, a magnetic diskette or a hard disk, or a transmission medium such as an electrical, optical or radio signal, or a telecommunications network.

An embodiment of the invention also relates to a vehicular network 30 including:
at least one node performing the destination node role as described above;
at least one mobile source node including means 112 for sending packets to a destination node, adapted to add to a packet to be sent current mobility information; and
if the source node and the destination node are not in direct radio range, at least one intermediate node including test means 108 adapted to verify whether the current geographical position of the node is closer to the destination geographical area than that of the preceding intermediate node.

An embodiment of the invention is equally applicable to pure ad hoc networks, i.e. ad hoc networks with no fixed infrastructure.

APPENDIX

Point A: coordinates (lat1, lon1)
Point B: coordinates (lat2, lon2)
where:
latx is the latitude and lonx is the longitude;
tc1 is the angle (expressed in radians between 0 and $\pi$) between a reference direction and a line between the intermediate node and the destination geographical area.

$$tc1 = |a\tan 2(\sin(lon2-lon1)*\cos(lat2), \cos(lat1)*\sin(lat2) - \sin(lat1)*\cos(lat2)*\cos(lon2-lon1))|$$

where:
a tan 2(x,y) is a function routinely used in programming languages that returns the arc tangent of the ratio of two variables x and y expressed in radians between $-\pi$ and $\pi$ (inclusive); and
|x| is the absolute value function.

This formula is derived from that for calculating the azimuth between two points. See for example http://mathforum.org/library/drmath/view/55417.html.

Although the present disclosure has been described with reference to one or more examples, workers skilled in the art will recognize that changes may be made in form and detail without departing from the scope of the disclosure and/or the appended or issued claims thereof.

The invention claimed is:

1. A method of communication between a source node in motion and a destination node, said source and destination nodes belonging to a vehicular network and being adapted to route packets in the network, the method including the following steps executed by a node of the vehicular network:
if the node corresponds to the destination node, executing the following steps by said destination node:
a step of receiving a packet sent by the source node further including current mobility information relating to the source node;
a step of storing said current mobility information relating to the source node; and
a step of routing at least one response packet to the source node, comprising:
a step of obtaining the stored current mobility information;
a step of predicting a location geographical area of the source node from the stored current mobility information relating to the source node the geographical area predicted in this way reputedly being a destination geographical area; and
at least one step of sending to the destination geographical area another packet including said response packet and the destination geographical area and, where appropriate, passing in transit through at least one intermediate node of the vehicular network; and
if the node corresponds to an intermediate node that is not the destination node, executing the following steps by said intermediate node:
a test step during which the intermediate node verifies whether its current position is closer to the destination geographical area than that of a preceding node from which the packet was received, which inserted its current position into said packet before forwarding it; and a step of forwarding the packet in transit to the destination geographical area only if the test is positive.

2. The method according to claim 1, wherein the packet sent by the source node, respectively the other packet, is received in parallel by a plurality of intermediate nodes and each intermediate node executes the test step and where appropriate forwards the packet, respectively the other packet, in order to route the packet, respectively the other packet, via a plurality of concurrent paths.

3. The method according to claim 1, wherein, before the step of forwarding the packet in transit toward the destination geographical area, said intermediate node further verifies if the angle between a reference direction and a line between the intermediate node and the destination geographical area is below a predetermined threshold.

4. The method according to claim 1, wherein, the destination node is an access point to a communications network connected to an entity adapted to authenticate a client;
before authentication, a packet sent by the source node to the access point is forwarded to the entity by the access point; and
after authentication, the access point authorizes the moving source node to access the communications network.

5. The method according to claim 1, wherein the location geographical area includes a geographical position and a mobility radius.

6. A node of a vehicular network, adapted to communicate with other nodes of the network and including:
means for receiving a packet sent by another moving node, said packet containing current mobility information relating to the other moving node;
a storage medium configured to store said current mobility information relating to the other moving node;
means for executing the following steps if the node corresponds to a destination node of the packet sent by the other moving node:
obtaining the stored current mobility information and predicting from the stored current mobility information relating to said other moving node a location geographical area of the other moving node to which a response packet is to be routed, the geographical area predicted in this way reputedly being a destination geographical area; and
means for sending to the destination geographical area another packet containing the response packet and the destination geographical area and, where appropriate, passing in transit through at least one intermediate node of the vehicular network; and
means for executing the following steps if the node corresponds to an intermediate node that is not the destination node:
verifying whether a current position of the node is closer to the destination geographical area than that of a preceding node from which the packet was received, which inserted its current position into said packet before forwarding it; and
forwarding the packet in transit to the destination geographical area only if verification is positive.

7. A vehicular network in which packets are routed by nodes as a function of a destination geographical area, including:
at least one node adapted to communicate with other nodes of the network and including:
means for receiving a packet sent by another moving node, said packet containing current mobility information relating to the other moving node;
a storage medium configured to store said current mobility information relating to the other moving node;
prediction means for obtaining the stored current mobility information and predicting from the stored current mobility information relating to said other moving node a location geographical area of the other moving node to which a response packet is to be routed, the geographical area predicted in this way reputedly being a destination geographical area; and
means for sending to the destination geographical area another packet containing the response packet and the destination geographical area and, where appropriate, passing in transit through at least one intermediate node of the vehicular network;
at least one mobile source node, referred to as said other moving node, including means for sending packets to a destination node, adapted to add to a packet to be sent current mobility information; and
at least one intermediate node including test means adapted, for a packet received and to be routed to a destination geographical area and if the source node and the destination node are not in direct radio range, to verify whether the current geographical position of the intermediate node is closer to the destination geographical area than that of a preceding intermediate node and for forwarding the packet to the destination geographical area only if verification is positive.

8. A non-transitory storage medium comprising a program stored thereon and readable by a node of a vehicular network to communicate with another node of the network, said other node being in motion, said program including program instructions for, when said program is executed by the node:
if the node corresponds to a destination node of a packet sent by said other node, referred to as a source node, executing the following steps by said destination node:
receiving the packet sent by the other node, said packet containing current mobility information relating to the source node;
a step of storing said current mobility information relating to the source node;
and, for routing a response packet to the source node:
a step of obtaining the stored current mobility information;
predicting a location geographical area of the source node from the stored current mobility information relating to the source node, the geographical area predicted in this way reputedly being a destination geographical area;
sending to the destination geographical area another packet containing said response packet and the destination geographical area; and
if the node corresponds to an intermediate node that is not the destination node, executing the following steps by said intermediate node:
verifying whether a current position of the node is closer to the destination geographical area than that of a preceding intermediate node, which inserted its current position into said packet before forwarding it; and
forwarding the packet in transit to the destination geographical area only if the verification is positive.

* * * * *

UNITED STATES PATENT AND TRADEMARK OFFICE
CERTIFICATE OF CORRECTION

PATENT NO.       : 8,379,611 B2                                     Page 1 of 1
APPLICATION NO. : 12/665873
DATED            : February 19, 2013
INVENTOR(S)      : Tchepnda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this
First Day of September, 2015

Michelle K. Lee
*Director of the United States Patent and Trademark Office*